(12) United States Patent
Gajewski

(10) Patent No.: US 6,747,117 B2
(45) Date of Patent: Jun. 8, 2004

(54) POLYURETHANE/UREA COMPOSITION FOR COATING CYLINDRICAL PARTS

(75) Inventor: Vincent J. Gajewski, Cheshire, CT (US)

(73) Assignee: Crompton Corporation, Middlebury, CT (US)

( * ) Notice: Subject to any disclaimer, the term of this patent is extended or adjusted under 35 U.S.C. 154(b) by 20 days.

(21) Appl. No.: 10/172,245

(22) Filed: Jun. 14, 2002

(65) Prior Publication Data

US 2003/0232954 A1 Dec. 18, 2003

(51) Int. Cl.$^7$ ................................................ C08G 18/10
(52) U.S. Cl. ........................... 528/61; 528/64; 427/425; 427/385.5
(58) Field of Search ............... 528/61, 64; 427/425, 427/385.5

(56) References Cited

U.S. PATENT DOCUMENTS

| 5,126,170 A | * | 6/1992 | Zwiener et al. |
| 5,580,945 A | * | 12/1996 | Wade et al. |
| 5,895,689 A | | 4/1999 | Gajewski .................... 427/425 |
| 5,895,806 A | | 4/1999 | Gajewski .................... 528/60 |
| 6,013,755 A | * | 1/2000 | Primeaux et al. |
| 6,027,769 A | | 2/2000 | Gajewski et al. ........... 427/425 |
| 6,399,736 B1 | | 6/2002 | Primeaux, II et al. |
| 2001/0051219 A1 | * | 12/2001 | Peter et al. |

FOREIGN PATENT DOCUMENTS

| DE | 19701835 | * | 7/1998 |
| EP | 1038897 | * | 9/2000 |
| EP | 1081171 A2 | | 3/2001 |

OTHER PUBLICATIONS

Ruprecht et al., Roll Covering by Rotational Casting with Fast–Reacting PUR Systems, Polyurethanes Business Group, Federal Republic of Germany, 1991, 478–481.

* cited by examiner

Primary Examiner—Rachel Gorr
(74) Attorney, Agent, or Firm—Michael P. Dilworth

(57) ABSTRACT

A polyurethane composition is disclosed that comprises an isocyanate-terminated polyurethane prepolymer, and a curative agent including a polyaspartic ester. Desirably, the curative agent includes a co-curative selected from the group consisting aromatic diamines and diols. This composition is useful for rotationally casting cylindrical parts. The invention includes the method for coating a cylindrical object.

19 Claims, No Drawings

POLYURETHANE/UREA COMPOSITION FOR COATING CYLINDRICAL PARTS

BACKGROUND OF THE INVENTION

1. Field of the Invention

The present invention relates to a polyurethane composition useful for coating cylindrical parts. More particularly, the present invention relates to a polyurethane composition comprising an isocyanate-terminated prepolymer and a curative mixture.

2. Description of Related Art

A variety of elastomeric materials can be used to cover parts that require protection. Polyurethane elastomers are used as coverings in applications where abrasion and tear resistance, good load bearing characteristics, high hardness, solvent resistance, and good flex fatigue resistance are required.

In steel mill applications, for example, large numbers of rolls are used for guiding, tensioning, and otherwise engaging the steel strip during rolling and pickling operations. These rolls are subject to strong chemical agents used for pickling and cleaning the strip. Similarly, in paper mills, polyurethane coated rolls are used for supporting and conveying paper through high pressure nips of paper making machine assemblies such as press rolls, calender stacks, and the like. In cutting blanket applications, polyurethane is used to ensure the knife cuts all the way through the material being cut. It is important that the cuts left from the knife impressions do not grow and connect, as the polyurethane will chunk out if they do. Excellent cut growth resistance is desirable in this application.

Ruprecht et al., "Roll Covering by Rotational Casting with Fast Reacting PUR Systems", Polyurethane World Congress 1991 (September 24–26) pp 478–481, describe rotational casting techniques useful for producing roll coverings using fast reacting polyurethane elastomer systems. In these systems, the polyurethane reaction mixture is metered through a movable mixing head that travels at constant speed in the axial direction along the rotating roll core, a short distance above its surface. The polyurethane reaction mixture solidifies very quickly, in a matter of seconds, to produce a polyurethane coating with a thickness buildup of 4–5 mm. Additional layers of the polyurethane reaction mixture are applied until the desired thickness is achieved.

U.S. Pat. No. 5,895,806 discloses a polyurethane composition comprising: a) an isocyanate-terminated polyurethane prepolymer; and b) a curative agent comprising i) a polyol; ii) an aromatic diamine; iii) a thixotropic aliphatic amine; and iv) a thixotropic colloidal additive.

U.S. Pat. No. 5,895,689 discloses a method for coating a cylindrical object which comprises applying to the cylindrical object an effective amount of a polyurethane composition comprising: a) an isocyanate-terminated polyurethane prepolymer; and b) a curative agent comprising i) a polyol; ii) an aromatic diamine; iii) a thixotropic aliphatic amine; and iv) a thixotropic colloidal additive, e.g., the composition of the '806 patent. By employing the polyurethane composition containing dual thixotropic agents, a thicker coating was achieved per pass without any dripping or ridging. These polyurethane coating compositions have found wide commercial use on rigid substrates. These compositions, however, lack high cut growth resistance.

It is therefore an object of the present invention to provide a new polyurethane composition useful for covering cylindrical objects that has improved cut growth resistance. It is a further object of this invention to provide a polyurethane composition which can be used in a rotational casting process.

SUMMARY OF THE INVENTION

The present invention is directed to a polyurethane composition that comprises:

A) an isocyanate-terminated polyurethane prepolymer; and

B) a curative agent, the curative agent includes a polyaspartic ester.

In another aspect, the present invention is directed to a method for coating a cylindrical object which comprises applying to the cylindrical object an effective amount of a polyurethane composition comprising:

A) an isocyanate-terminated polyurethane prepolymer; and

B) a curative agent, the curative agent includes a polyaspartic ester.

The most desirable embodiments of the composition and method of the invention include a curative agent with a co-curative agent selected from the group consisting of aromatic diamines and diols.

DESCRIPTION OF THE PREFERRED EMBODIMENTS

For purposes of this invention, the term "isocyanate-terminated polyurethane prepolymer" means the reaction product formed when an excess of organic diisocyanate monomer is reacted with a polyol or polyol blend. Isocyanate-terminated polyurethane prepolymers are preferred in which the excess diisocyanate monomer is removed after the reaction with the polyol or polyol blend.

The organic diisocyanate monomer can be aromatic or aliphatic. Useful aromatic diisocyanates can include, for example, 2,4-toluene diisocyanate and 2,6-toluene diisocyanate (each generally referred to as TDI); mixtures of the two TDI isomers; 4,4'-diisocyanatodiphenylmethane (MDI); p-phenylene diisocyanate (PPDI); diphenyl-4,4'-diisocyanate; dibenzyl-4,4'-diisocyanate; stilbene-4,4'-diisocyanate; benzophenone-4,4'-diisocyanate; 1,3- and 1,4-xylene diisocyanates; and mixtures of the foregoing. Preferred aromatic diisocyanates for the preparation of the polyurethane prepolymers of the present invention include TDI, MDI, and PPDI.

Useful aliphatic diisocyanates can include, for example, 1,6-hexamethylene diisocyanate; 1,3-cyclohexyl diisocyanate; 1,4-cyclohexyl diisocyanate (CHDI); the saturated diphenylmethane diisocyanate known as H(12)MDI; isophorone diisocyanate (IPDI); and the like; and mixtures of the foregoing. A preferred aliphatic diisocyanate for use herein is H(12)MDI.

High molecular weight (MW) polyols useful in the preparation of the isocyanate-terminated polyurethane prepolymer have a number average MW of at least 250, e.g., polyethers, polyester polyols, and the like. The number average molecular weight of the polyol can be as high as, e g., about 10,000 or as low as about 250. A molecular weight of about 650 to about 3000 is preferred with a molecular weight of about 2000 being most preferred.

A preferred high MW polyol is a polyalkyleneether polyol having a general formula $HO(RO)_nH$, wherein R is an alkylene moiety and n is an integer large enough that the polyether polyol has a number average molecular weight of at least about 250. Such polyalkyleneether polyols are well known and can be prepared by the polymerization of cyclic ethers, such as alkylene oxides and glycols, dihydroxyethers, and the like, employing methods known in the art Another preferred high MW polyol is a polyester polyol. Polyester polyols can be prepared by reacting dibasic acids (usually adipic acid, but other components, such as sebacic or phthalic acid, may be present) with diols such as ethylene glycol; 1,2-propylene glycol; 1,3 propanediol, 1,4 butanediol; diethylene glycol; tetramethylene ether glycol, and the like. Another useful polyester polyol can be obtained by the addition polymerization of ε-caprolactone in the presence of an initiator.

Other useful high MW polyols include polycarbonates, which are commercially available from Bayer (Leverkusen, Germany), and polyols that have two hydroxyl groups and whose backbone is obtained by polymerization or copolymerization of such monomers as butadiene and isoprene.

Particularly preferred polyols useful in the preparation of the isocyanate-terminated polyurethane prepolymer of this invention include dihydroxypolyesters, polytetramethyleneether glycols (PTMEG), and the polycarbonates.

The isocyanate-terminated polyurethane prepolymers can be prepared by reacting the organic diisocyanate monomer with the polyol or polyol blend in a mole ratio of diisocyanate monomer to polyol or polyol blend ranging from 1.7:1 to 12:1, depending on the diisocyanate monomer being used. For example, when the diisocyanate monomer is TDI, the preferred mole ratio is from about 1.7:1 to about 3:1. When the diisocyanate monomer is MDI, the preferred mole ratio is from about 2.5:1 to about 5:1. The excess diisocyanate monomer, after the reaction with the polyol or polyol blend, may be removed to form an isocyanate-terminated, low free monomer prepolymer.

The curative agent of the present invention includes a polyaspartic ester. Desirable embodiments of the curative agent comprise: i) a polyaspartic ester, and ii) a co-curative, such as, for example, an aromatic diamine or a diol. When the curative agent includes only a polyaspartic ester, it is desirable to increase the amount of isocyanate groups present for reaction.

The polyaspartic ester has the general formula:

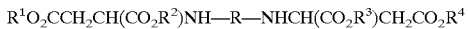

wherein $R^1$, $R^2$, $R^3$, and $R^4$ are the same or different and each are alkyl groups having from 1 to 12 carbon atoms, preferably from 1 to 4 carbon atoms, more preferably ethyl, and R can be aliphatic, alicyclic, or aromatic. Several polyaspartic esters are available commercially from Bayer Corporation under the trademark DESMOPHFEN wherein the R group is 4,4'-diphenylmethane, 3,3'-diphenylmethane, hexamethylene, or isophorone.

Aromatic diamines useful as a co-curative agent in the practice of the present invention can be any aromatic amine useful as a curative for polyurethane, such as, for example, 4,4'methylene-bis-(2-chloroaniline); 4,4'methylenedianiline (MDA); 4,4'methylenebis(2,6-diethylaniline); 4,4'methylenebis(2,6-dimethylaniline); 4,4'methylenebis(2-isopropyl-6-methylaniline); 4,4'methylenebis(2ethyl-6-methylaniline); 4,4'methylenebis(2,6isopropylaniline); 4,4'methylenebis(3-chloro-2,6-diethylaniline) (MCDEA); 4,4'methylenebis(3-chloroaniline) (MBCA); 1,3-propanediolbis(4-aminobenzoate); diethyltoluenediamine (DETDA); dimethylthiotoluenediamine (Ethacure 300 from Albemarle Corp.); and the like; and mixtures thereof The preferred diamines are the substituted MDA's.

Diols useful as a co-curative agent in the practice of the present invention will have a number average molecular weight of less than about 250. Suitable diols include ethylene glycol; 1,2-propylene glycol; 1,3-propanediol; 1,4-butanediol; 1,3-butylene glycol; 2-methyl-1,3-propanediol; 1,5-pentanediol; neopentyl glycol; 1,6-hexanediol; 2-ethyl-2-propyl-1,3-propanediol; cyclohexyldimethanol; cyclohexanediol; hydroquinonedi(betahydoxyethylether); resorcinoldi(betahydroxyethylether); and the like; and mixtures thereof Where an aromatic diamine is used as the co-curative, it is ordinarily mixed with the polyaspartic ester to form the curative agent in an amount from greater than 0 to about 80 weight percent, based on the total weight of the curative agent. A preferred range is from about 5 to about 50 wt %. A more preferred range is from about 15 to about 40 wt %.

Where a diol is used as the co-curative, it is ordinarily mixed with the polyaspartic ester to form the curative agent in an amount from greater than 0 to about 50 weight percent, based on the total weight of the curative agent. A preferred range is from about 5 to about 30 wt %. A more preferred range is from about 5 to about 15 wt %.

Preferably, the isocyanate-terminated polyurethane prepolymer can be mixed with the curative agent in amounts such that the total hydrogen content of the curative agent is equal to about 85 to about 120% moles of the total isocyanate content of the isocyanate-terminated polyurethane prepolymer. In a more preferred embodiment, the total active hydrogen content of the curative agent is equal to about 95 to about 105% of the total isocyanate content of the isocyanate-terminated polyurethane prepolymer.

If desired, the reaction between the prepolymer and the curative agent to form the polyurethane composition can take place in the presence of a catalyst. Useful catalysts include organometallic compounds, such as organotins, e.g., dibutyltindilaurate, stannous octoate, and the like. Also useful are the tertiary amines, e.g., triethylenediamine, triethylamine, n-ethylmorpholine, dimethylcyclohexylamine, 1,8-diazabicyclo-5,4,0-undecene-7, and the like. It is also contemplated that other materials known to those skilled in the art can be present in the curative agent.

The polyurethane composition of this invention can be reacted, mixed, and applied to various substrates without the need of molds in a rotational casting process at temperatures in the range of about 25° C. to 70° C., such as is described by Ruprecht et al., supra.

The advantages and the important features of the present invention will be more apparent from the following examples.

EXAMPLES

Example 1

Preparation of a TDI Isocyanate-Terminated Prepolymer

An isocyanate-terminated prepolymer was prepared by reacting 230 grams (1.32 moles) of TDI with 627 grams (0.44 mole) of a 1425 molecular weight polyethyleneadipate glycol polyester for three hours at 80° C. in a 3-neck, 3 liter round bottom flask equipped with a stirrer, a nitrogen inlet, and a heating mantle. The residual free TDI monomer is then removed to yield a prepolymer with an NCO content of 5.2%.

Example 2
Preparation of a Curative Agent

A curative agent was prepared by mixing, in a beaker at 70° C. for 15 minutes,
a) a polyaspartic ester as purchased from Bayer Corporation under the trademark Desmophen NH1420; and
b) methylene bis diethylaniline (MDEA), in a weight ratio of 65 parts of Desmophen NH 1420 to 35 parts of MDEA, resulting in an amine equivalent weight of 217.

Example 3
Preparation of a Curative Agent

A curative agent was prepared by mixing, in a beaker at 70° C. for 15 minutes,
a) the polyaspartic ester of Example 2; and
b) methylene bis methylethylaniline (MMEA), in a weight ratio of 65 parts Desmophen NH1420 to 35 parts MMEA, resulting in an amine equivalent weight of 207.

Example 4
Preparation of a Polyurethane Composition Suitable for Rotational Casting The isocyanate-terminated prepolymer of Example 1 was mixed with the curative agent of Example 2 at a temperature of 35° C. in a meter mix machine at a weight ratio of 100 to 28.2, respectively, resulting in a mixture with an active hydrogen to isocyanate ratio of 105%. The mixture was then dispensed on a rotating core. Test pieces were also molded.

Example 5
Preparation of a Polyurethane Composition Suitable for Rotational Casting The isocyanate-terminated prepolymer of Example 1 was mixed with the curative agent of Example 3 at a temperature of 35° C. in a meter mix machine at a weight ratio of 100 to 26.9, respectively, resulting in a mixture with an active hydrogen to isocyanate ratio of 105%. The mixture was then dispensed on a rotating core. Test pieces were also molded.

Example 6
Preparation of an MDI Isocyanate-Terminated Prepolymer

An isocyanate-terminated prepolymer was prepared by reacting 400 grams (1.6 moles) of MDI with 1000 grams (0.4 mole) of a 2500 MW polyethyleneadipate glycol polyester for three hours at 80° C. in a 3-neck, 3 liter round bottom flask equipped with a stirrer, a nitrogen inlet, and a heating mantle. The resultant NCO content was measured at 7.2%.

Example 7
Preparation of a Curative Agent

A curative agent was prepared by mixing in a beaker at 70° C. for 15 minutes,
a) a polyaspartic ester as purchased from Bayer Corporation under the trade name Desmophen NH1420; and
b) 1,4-butanediol, in a weight ratio of 90 to 10, respectively.

Example 8
Preparation of a Polyurethane Composition Suitable for Rotational Casting The isocyanate-terminated prepolymer of Example 6 was mixed with the curative agent of Example 7 at a temperature of 70° C. in a meter mix machine at a weight ratio of 100 to 32.9, resulting in mixture with an active hydrogen to isocyanate ratio of 105%. Test pieces were molded.

Comparative Example A
Preparation of the Polyurethane of U.S. Pat. No. 5,895,806

The prepolymer of Example 1 and the curative agent of Example 2 of U.S. Pat. No. 5,895,806 were prepared as described therein. The polyurethane composition of Example 3 of U.S. Pat. No. 5,895,806 was prepared from that prepolymer and curative agent via rotational casting, as described therein, except that the mix ratio was such that the active hydrogen to isocyanate ratio was 105%. Test pieces were molded.

Comparative Example B
Preparation of a Polyurethane of U.S. Pat. No. 5,895,806 at a Lower Durometer Hardness The prepolymer of Example 1 of U.S. Pat. No. 5,895,806 was prepared as described therein. The curative agent of Example 2 of U.S. Pat. No. 5,895,806 was modified to match more closely the durometer hardnesses of the Examples of the present invention. This was accomplished by changing the concentrations of the PTMG, DETDA, and DMTDA such that the composition had a weight ratio of 80 PTMG to 5 DETDA to 15 DMTDA to 2.5 Aerosil to 0.3 Jeffamine. The prepolymer and this curative agent were mixed such that the active hydrogen to isocyanate ratio was 105%.

The flex fatigue resistance for each test example was measured at 70° C. with a Texus flexometer, model no 31-11. The test measures cut growth resistance in accordance with ASTM D-3629-78 at a bending angle of 30 degrees and a rotation rate of 500 rpm. The results are shown in Table 1.

TABLE 1

| Example | 4 | 5 | 8 | A | B |
|---|---|---|---|---|---|
| Durometer | 90A | 90A | 87A | 67D | 90A |
| Flex Cycles | 400K | 900K | 225K | 5K | 40K |

In view of the many changes and modifications that can be made without departing from principles underlying the invention, reference should be made to the appended claims for an understanding of the scope of the protection to be afforded the invention.

What is claimed is:

1. A polyurethane composition comprising:
   A) an isocyanate-terminated polyurethane prepolymer comprising the reaction product of a polyol or polyol blend and an organic diisocyanate monomer selected from the group consisting of 2,4-toluene diisocyanate; 2,6-toluene diisocyanate: 4,4'-diisocyanatodiphenylmethane; p-phenylene-diisocyanate: diphenyl-4,4'-diisocyanate: dibenzyl-4,4'-diisocyanate; stilbene-4,4'-diisocyanate: benzophenone-4,4'-diisocyanate; 1,3- and 1,4-xylene diisocyanates; 1,6-hexamethylene diisocyanate; 1,3-cyclohexyl diisocyanate; 1,4-cyclohexyl diisocyanate; H(12)MDI; isophorone diisocyanate; and mixtures of the foregoing;
   B) a curative comprising a polyaspartic ester; and
   C) an aromatic diamine co-curative agent.

2. The polyurethane composition of claim 1 wherein the organic isocyanate monomer is selected from the group consisting of 4,4'-diisocyanatodiphenylmethane; 2,4-toluene diisocyanate; 2,6-toluene diisocyanate; p-phenylene-diisocyanate; H(12)MDI; and mixtures of the foregoing.

3. The polyurethane composition of claim 1 wherein the polyaspartic ester is of the general formula:

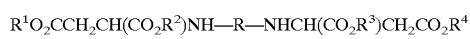

wherein $R^1$, $R^2$, $R^3$, and $R^4$ are independently selected from the group consisting of alkyl groups having from 1 to 12 carbon atoms, and R is aliphatic, alicyclic, or aromatic.

4. A The polyurethane composition of claim 3 wherein R is selected from the group consisting of 4,4'-diphenylmethane, 3,3'-diphenylmethane, hexamethylene, and isophorone.

5. The polyurethane composition of claim 1 wherein the aromatic diamine co-curative agent is selected from the group consisting of 4,4'methylene-bis-(2-chloroaniline); 4,4'methylenedianiline;

4,4'methylenebis(2,6-diethylaniline); 4,4'methylenebis(2,6-dimethylaniline);

4,4'methylenebis(2-isopropyl-6-methylaniline); 4,4'methylenebis(2ethyl-6-methylaniline);

4,4'methylenebis(2,6isopropylaniline); 4,4'methylenebis (3-chloro-2,6-diethylaniline);

4,4'methylenebis(3-chloroaniline); 1,3-propanediolbis(4-aminobenzoate);

diethyltoluenediamine; dimethylthiotoluenediamine; and mixtures thereof.

6. The polyurethane composition of claim 1 wherein the isocyanate-terminated polyurethane prepolymer is prepared by reacting an organic diisocyanate monomer with a polyol or polyol blend, in a mole ratio of organic diisocyanate monomer to polyol or polyol blend ranging from about 1.7:1 to about 12:1.

7. The polyurethane composition of claim 6 wherein the isocyanate-terminated polyurethane prepolymer is prepared by reacting TDI with a polyol or polyol blend in a mole ratio of TDI to polyol or polyol blend ranging from about 1.7:1 to about 3:1.

8. The polyurethane composition of claim 6 wherein the isocyanate-terminated polyurethane prepolymer is prepared by reacting MDI with a polyol or polyol blend in a mole ratio of MDI to polyol or polyol blend ranging from about 2.5:1 to about 5:1.

9. The polyurethane composition of claim 1 wherein the total active hydrogen content of the curative agent and co-curative agent is equal to about 85 to about 115% of the total isocyanate content of the isocyanate-terminated polyurethane prepolymer.

10. A method for coating a cylindrical object which comprises applying to the cylindrical object an effective amount of a polyurethane composition comprising:

A) an isocyanate-terminated polyurethane prepolymer comprising the reaction product of a polyol or polyol blend and an organic diisocyanate monomer selected from the group consisting of 2,4-toluene diisocyanate; 2,6-toluene diisocyanate: 4.4'-diisocyanatodiphenylmethane; o-phenylene-diisocyanate; diphenyl-4,4'-diisocyanate; dibenzyl-4.4'-diisocyanate; stilbene-4,4'-diisocyanate: benzophenone-4,4'-diisocyanate; 1,3- and 1,4-xylene diisocyanates; 1,6-hexamethylene diisocyanate; 1,3-cyclohexyl diisocyanate: 1,4-cyclohexyl diisocyanate; H(12)MDI; isophorone diisocyanate; and mixtures of the foregoing;

B) a curative agent comprising a polyaspartic ester; and

C) an aromatic diamine co-curative agent.

11. The method of claim 10 wherein the organic isocyanate monomer is selected from the group consisting of 4,4'-diisocyanatodiphenylmethane; 2,4-toluene diisocyanate; 2,6-toluene diisocyanate; p-phenylene-diisocyanate; H(12)MDI; and mixtures of the foregoing.

12. The method of claim 10 wherein the polyaspartic ester is of the general formula:

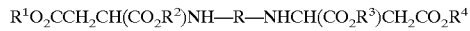

$$R^1O_2CCH_2CH(CO_2R^2)NH-R-NHCH(CO_2R^3)CH_2CO_2R^4$$

wherein $R^1$, $R^2$, $R^3$, and $R^4$ are independently selected from the group consisting of alkyl groups having from 1 to 12 carbon atoms, and R is aliphatic, alicyclic, or aromatic.

13. The method of claim 12 wherein R is selected from the group consisting of 4,4'-diphenylmethane, 3,3'-diphenylmethane, hexamethylene, and isophorone.

14. The method of claim 10 wherein the an aromatic diamine co-curative agent is selected from the group consisting of 4,4'methylene-bis-(2-chloroaniline); 4,4'methylenedianiline; 4,4'methylenebis(2,6-diethylaniline); 4,4'methylenebis(2,6-dimethylaniline); 4,4'methylenebis(2-isopropyl-6-methylaniline); 4,4'methylenebis(2ethyl-6-methylaniline); 4,4'methylenebis(2,6isopropylaniline); 4,4'methylenebis(3-chloro-2,6-diethylaniline); 4,4'methylenebis(3-chloroaniline); 1,3-propanediolbis(4-aminobenzoate); diethyltoluenediamine; dimethylthiotoluenediamine; and mixtures thereof.

15. The method of claim 10 wherein the isocyanate-terminated polyurethane prepolymer is prepared by reacting an organic diisocyanate monomer with a polyol or polyol blend, in a mole ratio of organic diisocyanate monomer to polyol or polyol blend ranging from about 1.7:1 to about 12:1.

16. The method of claim 15 wherein the isocyanate-terminated polyurethane prepolymer is prepared by reacting TDI with a polyol or polyol blend in a mole ratio of TDI to polyol or polyol blend ranging from about 1.7:1 to about 3:1.

17. The method of claim 15 wherein the isocyanate-terminated polyurethane prepolymer is prepared by reacting MDI with a polyol or polyol blend in a mole ratio of MDI to polyol or polyol blend ranging from about 2.5:1 to about 5:1.

18. The method of claim 10 wherein the total active hydrogen content of the curative agent and co-curative agent is equal to about 85 to about 115% of the total isocyanate content of the isocyanate-terminated polyurethane prepolymer.

19. The method of claim 10 wherein the polyurethane composition is applied to the cylindrical object by rotational casting.

* * * * *